United States Patent [19]

Brennan

[11] Patent Number: 5,699,956
[45] Date of Patent: Dec. 23, 1997

[54] MAGNETIC POST CARD AND METHOD OF MANUFACTURING THE SAME

[76] Inventor: William James Brennan, 59-569B Ke Iki Rd., Haleiwa, Hi. 96712

[21] Appl. No.: 590,367

[22] Filed: Jan. 25, 1996

[51] Int. Cl.⁶ .................................. B65D 27/00
[52] U.S. Cl. .................................. 229/92.8
[58] Field of Search .............. 229/92.8; 283/56; 40/711, 768

[56] References Cited

U.S. PATENT DOCUMENTS

| | | |
|---|---|---|
| H317 | 8/1987 | Gladden. |
| 3,986,283 | 10/1976 | Pelaez. |
| 4,236,331 | 12/1980 | Mattson. |
| 4,310,978 | 1/1982 | Stern. |
| 4,887,763 | 12/1989 | Sano ........................ 229/92.8 X |
| 5,102,171 | 4/1992 | Saetre. |
| 5,261,174 | 11/1993 | Blegen ........................ 40/152 |
| 5,288,011 | 2/1994 | Yoshioka ........................ 229/92.8 |
| 5,303,489 | 4/1994 | Blegen ........................ 40/152 |
| 5,458,282 | 10/1995 | Martin ........................ 229/92.8 |

*Primary Examiner*—Jes F. Pascua
*Attorney, Agent, or Firm*—Robert Carson Godbey

[57] ABSTRACT

A magnetic novelty post card incorporating a thin sheet of magnetic material that will self-adhere to metal surfaces, and allowing an image on the front or obverse face and printed material or correspondence on the back or reverse face. A method of manufacturing a magnetic novelty post card that allows a matrix of multiple post card images to be aligned in proper registration with multiple printed paper backs, thus permitting economic and efficient use of existing post card printing plates and permitting the cutting of the multiple images into individual post cards by use of conventional die cutting or shear cutting means.

4 Claims, 2 Drawing Sheets

MAGNETIC POST CARD AND METHOD OF MANUFACTURING THE SAME

BACKGROUND OF THE INVENTION

The present invention relates generally to post cards and, more particularly, to a new and improved speciality post card containing a magnetic material allowing it to be displayed on refrigerators or other metal items, and which allows an image on the front or obverse face of the post card and printed material or correspondence on the back or reverse face of the post card. The present invention also relates to a method of manufacturing such a magnetic novelty post card, and more particularly to a method that allows a obverse side sheet material, containing multiple post card images, to be aligned in proper registration with a reverse side sheet material, containing multiple printed paper backs, thus permitting economic and efficient use of standard post card printing plates and permitting the cutting of the aligned array of sheets containing multiple images into individual post cards by use of conventional die cutting or shear cutting means.

DESCRIPTION OF THE RELATED ART

Novelty post cards are well known in the art, including post cards that incorporate a means for attachment to a flat surface. See, e.g., Pelaez, U.S. Pat. No. 3,986,283. Where such means of attachment involve adhesives, however, such post cards can be difficult to remove. Static cling vinyl has been used for multipart greeting cards, which provides a removable means of adhering a greeting card to a smooth, non-porous surface. See, e.g., Saetre, U.S. Pat. No. 5,102,171. This has the advantage of being reusable and not involving permanent adhesives, but is not well suited for a post card format, since the design must be printed on a thin sheet of static cling vinyl, which is not suited for the commercial lithographic printing presses that produce post cards. For mailing and handling purposes the static cling vinyl also will need to be attached to sheet form material for stiffness.

Magnetic articles used to temporarily secure materials to metal surfaces are well known in the art. See, e.g., Stern, U.S. Pat. No. 4,310,978. These magnetic materials tend to be bulky and heavy, and the articles have printed material on one side only. The do not allow printed material or correspondence on the reverse side. Nor do these articles address the difficulties associated when laminating opposing printed surfaces together over a magnetic material in a registered manner. These articles were not designed to be mailed and would require time and expense to find suitable packing material and to determine the correct postage needed.

The prior art does not disclose any invention with the desirable characteristics of a post card format incorporating a magnetic means for securing the post card to metal surfaces.

SUMMARY OF THE INVENTION

In view of the failure of the prior art to provide attractive, magnetically positionable, economical post cards, the object of the present invention is to provide improved specialty post cards incorporating a flexible sheet of magnetic material imbedded in the post card for securing the post card to metal surfaces and allowing an image on one side (the obverse side) and printed material or correspondence on the other side (the reverse side).

By incorporating a flexible sheet of magnetic material imbedded in the post card, the post cards may be affixed to refrigerators, file cabinets, and other metal object. A large percentage of households have magnetic display items on their refrigerators. Oftentimes pictures are obscured by the magnets holding them up. The magnetic post cards of this invention can be affixed themselves to refrigerators, file cabinets, and the like, and also can hold notes, coupons, and various other items. The magnetic post cards are convenient as gifts; one need only write a message, address the post card, stamp and mail. The magnetic feature of this post card allows it to be easily removed and repositioned on a refrigerator, filing cabinet, and the like, and it will not abrade or leave adhesive residue by its method of attachment.

A further object of the present invention is to provide a novel assembly of laminated materials constructed and arranged to provide a speciality post card incorporating a magnetic means for securing the post card to metal surfaces such that the post card weighs less than one ounce, thus minimizing postal expense for mailing such post card. Thus this post card is a convenient gift, needing only standard letter rate postage and an address to be sent.

A further object of the present invention is to provide an advertising medium which is not likely to be discarded. Many businesses go to great effort and expense to print and mail advertisements which are discarded by the receiver without even being read. This practice is so commonplace that the term "junk mail" has become an everyday part of our language. It is an object of the present invention to provide a card which when used for advertising has two sides for conveying its information, and thus may be contain, for example, a visually appealing image on its display side while the less sightly verbiage is contained on the reverse side. Thus the post card could utilize an attractive picture with an identifying logo on the front of the card, while the reverse side may contain information such as menus, services provided, and the like, which, in combination with the magnetic features of the cards, greatly increases the likelihood that these cards will be retained and displayed. The identifying logo will simplify determining what card has the information desired to be readily retrieved.

Medical services providers may wish to utilize the invention having identifying pictorial matter on the display side along with appropriate emergency phone numbers, while the reverse face may contain pertinent first aid procedures. Oftentimes refrigerators and file cabinets where the cards will likely be displayed are in the vicinity of a telephone, and they also provide a high visibility medium for display. It is unlikely that anyone given such a card would discard it; perhaps lives could be saved.

It is a further object of this invention to provide a method of manufacture of such magnetic post cards that is efficient and inexpensive. The thickness of the magnetic post card prevents traditional printing methods from being successful. Accordingly, it is an object of this invention to provide a method of manufacturing such a magnetic novelty post card that allows the obverse side sheet material, containing a matrix of multiple post card images, to be aligned in proper registration with the reverse side sheet material, containing multiple printed backs, thus permitting economic and efficient use of existing post card printing plates. The proper relationship between the images on one side and printed material on the opposing side is critical to allow the aligned array of sheets containing the multiple images to be cut into individual post cards by use of conventional die cutting or shear cutting means.

Still further objects and advantages will become apparent from a consideration of the ensuing description and drawings.

BRIEF DESCRIPTION OF THE DRAWINGS

The features of the invention are set out in the following, with specific reference to the accompanying drawings, in which like reference numbers indicate corresponding parts throughout the several figures.

DESCRIPTION

Figure 1:
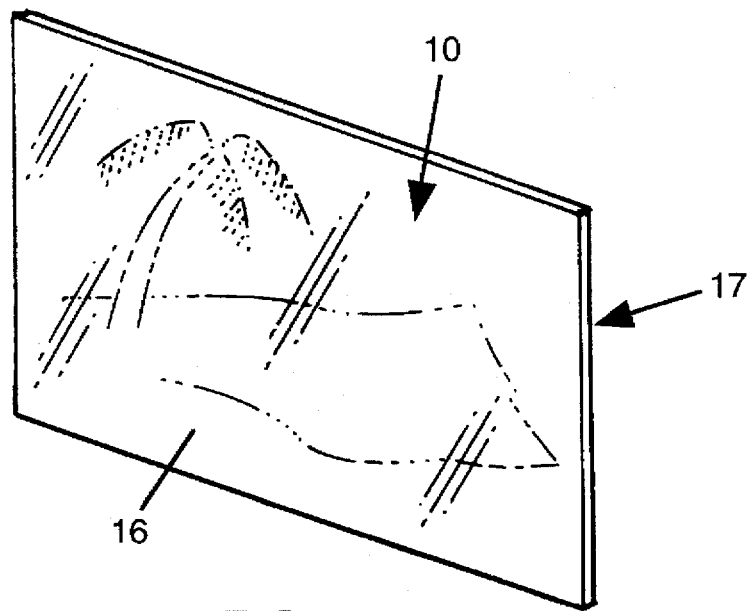
FIG. 1 is a perspective view of the magnetic post card.

Referring initially to FIG. 1, a magnetic post card assembly 10 is shown in representative form, including a front or obverse face of the card 16, containing an image or pictorial matter, and a back or reverse face of the card 17, which is a material suitable for printing, writing a message, or addressing the post card, and which is the more magnetic side of the card.

Figure 2:
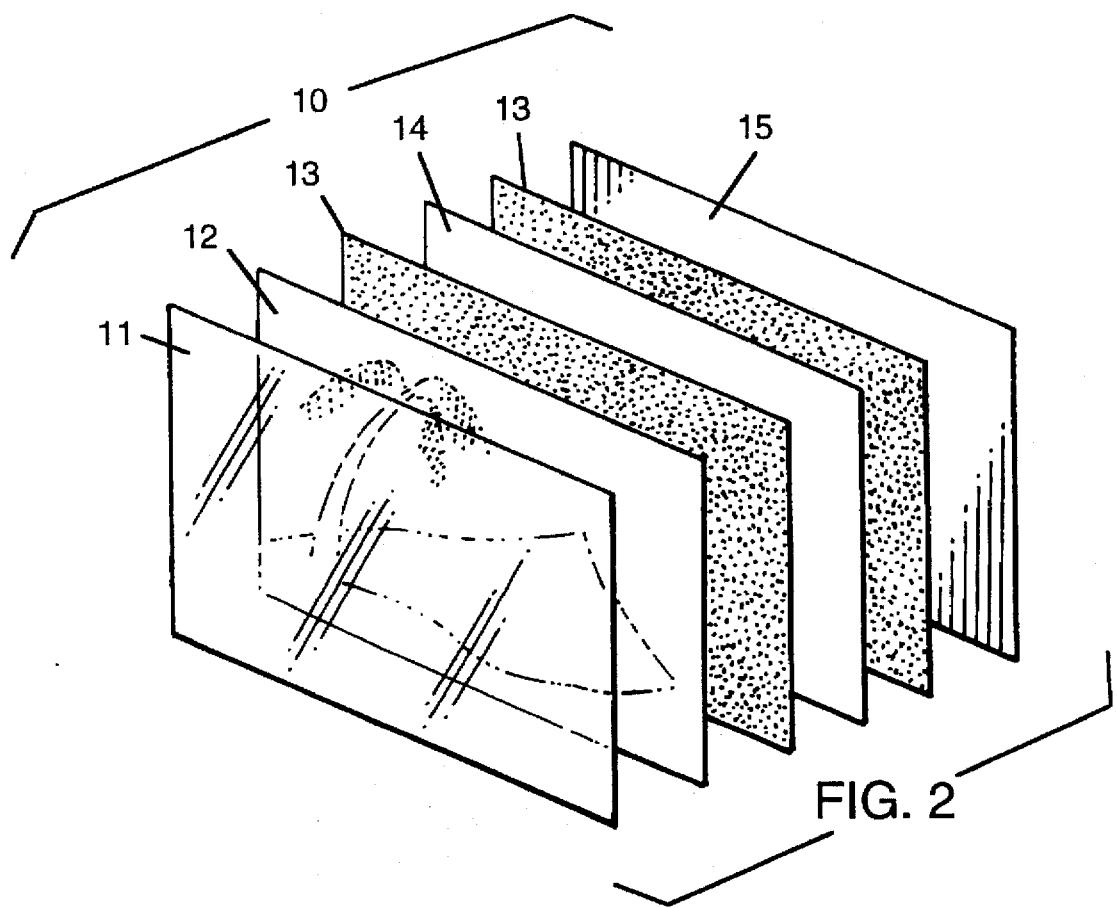
FIG. 2 is an exploded view thereof showing the components.

Referring additionally to FIG. 2, it will be seen that in the preferred embodiment the magnetic post card assembly 10 includes a transparent ultra-violet resistant plastic laminate 11, a thin rectangular sheet-form material 12, having a post card image, photograph, lithograph, or the like imprinted on its obverse face, an adhesive layer 13, a flat sheet of magnetic material 14, an adhesive layer 13, and a back of a second thin rectangular sheet-form material 15, forming the reverse face of the card.

In the preferred embodiment, a clear ultra-violet resistant plastic laminate 11 is rolled on to the post card image 12. In an alternative embodiment, a sheet-form transparent ultra-violet resistant plastic laminate can be fixed to the post card image. In either case, the ultra-violet resistant laminate provides protection from abrasion, moisture, and fading. In the preferred embodiment a ultra-violet resistant laminate is applied to the post card image prior to the assembly of the components of the post card.

In the preferred embodiment the magnetic material 14 is a flat sheet of elastomeric material having dispersed therein a large plurality of small magnetic iron particles. Generally this material is commercially available from known suppliers in a sheet thickness of 15 mils. In the preferred embodiment the magnetic material has a sheet thickness of 10 mils, which is commercially available upon special order.

In the preferred embodiment of the invention, the first rectangular sheet-form material constituting the front or obverse face of the post card, upon which the image is imprinted, is commercially available lithography grade paper stock of approximately half the weight normally used by post card manufacturers. The second rectangular sheet-form material constituting the back or reverse face of the post card is printed paper, of similarly light weight paper stock. The combination of this lightweight lithography grade paper stock and lightweight paper back, utilized in conjunction with a magnetic sheet material having a thickness of 10 mils, allows the post card to weigh less than one ounce for first class postage, which is important for consumer acceptance and to minimize the cost of mailing. In the preferred embodiment of the invention a postal information label is printed on the paper back of the post card, so the consumer knows the appropriate amount of postage for the magnetic post card.

The printed paper back 15 in the preferred embodiment includes a printed brief description of the post card image 12, and leaves room in traditional post card fashion for the purchaser to write a note and address the post card. Alternatively, additional printed material can be added to the paper back, such as advertising copy, information, or other promotional materials.

This invention also provides a method for manufacturing the magnetic post cards. Traditional printing methods do not work because of the weight and thickness of the magnetic material. The method of this invention allows the post cards to be manufactured in such a way that the image on the front or obverse face of the card and the printed material on the back or reverse face of the card can be laminated together aligned in a registered manner.

Post card manufacturers generally print multiple post card sized images on an uncut sheet of lithography stock. One standard size, for example, utilizes sixteen post card sized images in an array of four up and four down, with a total dimension of approximately 25 inches by 18 inches.

The proper relationship between the images and printed material on the opposing sides of the post cards is critical to allowing the assembly of an array of the various component sheets of properly registered cards that can then be cut into individual cards by use of conventional die cutting or shear cutting means.

In the preferred embodiment of this invention, the images are printed on a lighter weight lithography stock, generally half the weight of standard post card lithography stock. The additional stiffness provided by the magnetic material and the paper backs makes standard stock unnecessary. The lighter weight lithography stock utilized in the preferred embodiment of the invention minimizes the weight of each post card, allowing the desired goal of a post card of less than one ounce weight. The printed material for the obverse face is also printed on lighter weight stock, generally half the weight of standard post card lithography stock.

The method of manufacturing of this invention will allow the utilization of post card manufacturer's standard lithography plates to produce a magnetic version of their cards, without the time and expense of additional color separations and set up to produce specialized image sheets. The lighter weight stock utilized by the invention can simply be run through at any convenient time in a press run. This will allow the production of a magnetic novelty post card which is inexpensive to produce in large volumes and which will appeal to promotional, advertising, and souvenir industries and is unlikely to be discarded due to its visually appealing and functional nature.

In one embodiment of the method of manufacturing the magnetic post cards pressure sensitive mounting adhesive is utilized. "Peel and stick" pressure sensitive adhesive is covered by a protective release liner; when the release line is peeled away from the adhesive it can then be positioned as desired and pressure applied to fix the adhesive. Peel and stick varieties of pressure sensitive adhesive are available in cut sheets, pre-coated boards, and in large rolls for volume applications with roll applicators. Pressure sensitive adhesives are tacky (sticky) to the touch and are activated by pressure. This adhesive means is desirable for volume production and laminations.

Figure 3:
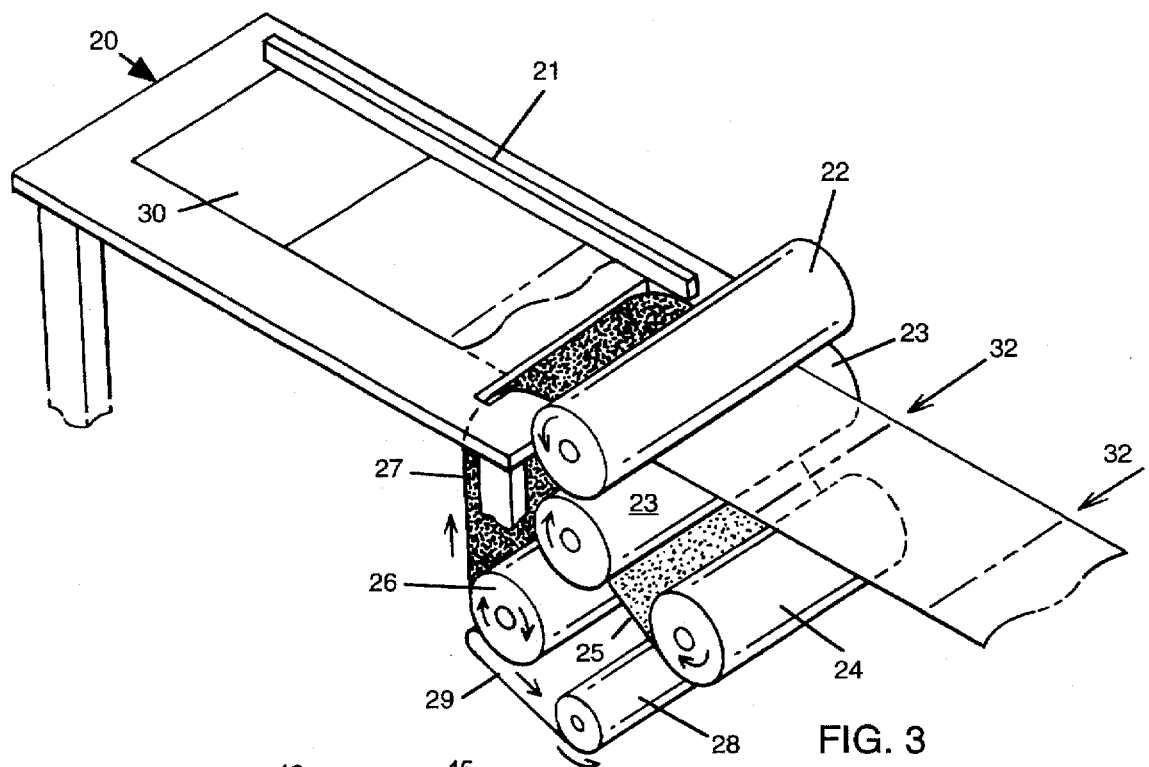
FIG. 3 is a perspective schematic view of the roll sheet magnetic post card assembly table.

Referring additionally to FIG. 3, in one embodiment of the method for manufacturing the magnetic post cards pressure sensitive mounting adhesive is utilized. A flat sheet of material having fixed on its obverse side a matrix of post card sized images, 30, is placed upon an assembly table 20, image side up, flush against the guide rail 21. This image sheet, 30, is fed toward an upper laminating nip roller 22 and a lower laminating nip roller 23. A roll of flat magnetic material 26 having one adhesive side that is covered by a pressure sensitive adhesive protected by a release liner is fixed beneath the assembly table. The magnetic material 26 is fed upward toward a slot in assembly table 20. The release liner 29 is separated from the adhesive side of the magnetic material 27 and rolled onto a release liner roller 28, with the magnetic material fed upward onto the assembly table with its exposed adhesive side facing up. The image sheet, 30, is moved toward the nip rollers and onto the exposed adhesive side of the magnetic material 27. Simultaneously a roll of pressure sensitive sheet adhesive, 24, also having a release liner on one side, rolls upward to the underside of the magnetic material, such that the exposed adhesive side of the pressure sensitive sheet is placed into contact with the underside, or reverse side, of the magnetic material prior to entering the nip rollers 22 and 23. The image sheet and magnetic material roll through the nip rollers, which apply pressure to the sheets, and to a suitable cutting means, indicated at 32, where the image sheet is cut into a large rectangle, thus producing an array of superimposed flat sheets of material with an image sheet having a matrix of post card sized images fixed on its obverse face, magnetic material fixed by adhesive to the reverse face of the image sheet, and an adhesive with release liner still protecting its exposed reverse face fixed to the reverse side of the magnetic sheet. This sheet assembly is placed on the assembly table with the obverse image side facing down. The leading edge of the adhesive release liner is then removed and the printed paper backs for the reverse face of the post cards is aligned in proper registration with the images on the obverse face and pressed down on the exposed adhesive. The sheet assembly is then fed back through the nip rollers as the release liner is peeled away.

The completed sheet assembly is thus an array of superimposed sheets having a matrix of post card sized images fixed on its obverse side and a similar matrix of printed backs on the reverse side, aligned in proper registration. The sheet assembly can then be cut into multiple individual post cards. The sheet assembly can be die cut by conventional means, such that a knife edge die is place over the array of superimposed sheets and forced downward substantially simultaneously die cutting the array of post cards into individual post cards. Alternatively the sheet assembly can be shear cut by conventional means, such that blades with a cutting action make individual shear cuts through the array of superimposed sheets cutting the array into a plurality of individual post cards.

In another embodiment of the method of manufacturing the magnetic post cards a dry mount adhesive requiring heat and pressure to activate the adhesive is utilized. Dry mount adhesives are commercially available in rolls or precut sheets and are completely dry (non-tacky) to the touch. Under the combination of heat and pressure in a mounting press they activate and form an adhesive bond.

Figure 4:
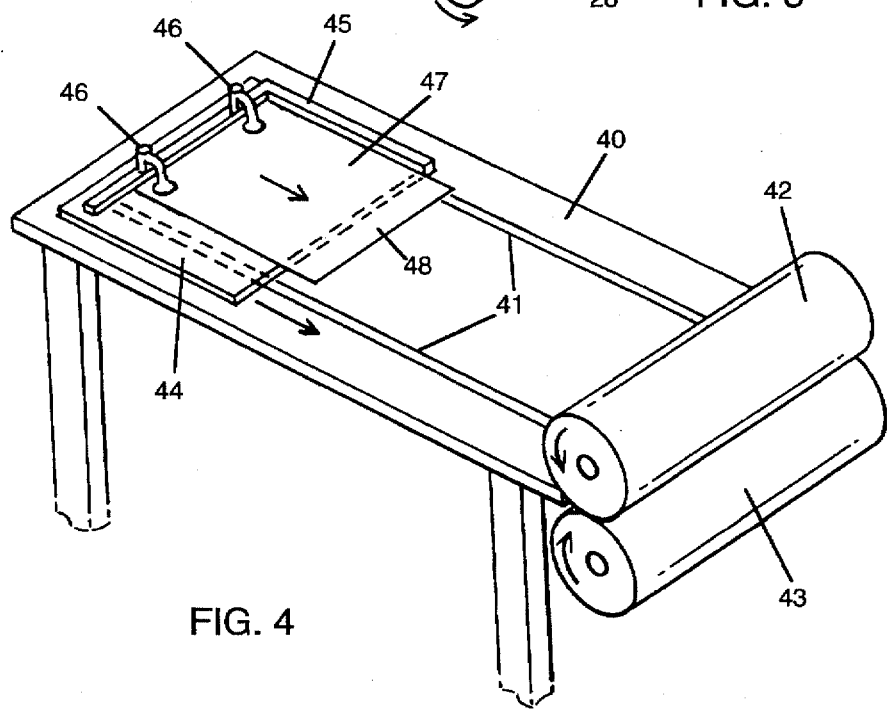
FIG. 4 is a perspective schematic view of the cut sheet magnetic post card assembly table.

Referring additionally to FIG. 4, in one embodiment of the method for manufacturing the magnetic post cards, a rectangular flat sheet of magnetic material is pre-coated on both sides with a dry mount adhesive and a sliding plate assembly table 40 is utilized. A flat sheet of material having fixed on its obverse side a matrix of post card sized images is placed against one side of the sheet of magnetic material, with its reverse side against the dry mount adhesive on one face of the magnetic material. A sheet of printed paper backs is placed against the dry mount adhesive on the reverse face of the sheet of magnetic material, forming a sheet assembly, 47. A sheet assembly is placed on a sliding assembly plate 44 and the images on the obverse side and the printed paper backs on the reverse side are aligned in proper registration against a squaring beam guide rail 45. Position clamps 46 hold the superimposed sheets forming a sheet assembly 47 in proper alignment. A sliding assembly plate 44 is moved forward on parallel rails 41 until the leading edge of the sheet assembly, 48, reaches heated nip rollers 43. The sheet assembly is moved forward through the heated nip roller while held in proper alignment. As the sheet assembly is fed through the heated nip rollers, the clamps are released. The heat and pressure of the nip rollers activate the dry mount adhesive. The completed sheet assembly having the images on the obverse side aligned in proper registration with the printed material on the reverse side is then ready to be shear cut by conventional means or die cut by conventional means, as previously described.

Accordingly, the reader will see that the magnetic post card of this invention is an attractive and inexpensive novelty item, easily mailed, and of interest and value to its recipient. The method of manufacturing of this invention allows such magnetic post cards to be inexpensively and conveniently manufactured, without requiring the time and expense of additional color separations and set up to produce specialized image sheets.

Although the description above contains many specificities, these should not be construed as limiting the scope of the invention, but as merely providing illustrations of some of the presently preferred embodiments of this invention. Thus the scope of the invention should be determined by the appended claims and their legal equivalents, rather than by the examples given.

What is claimed is:

1. A novelty post card comprising:
   a. a first flat rectangular sheet-form material of post card sized dimensions, having an image fixed on its obverse face;
   b. a flat sheet of magnetic material attached by a first adhesive means to the reverse side of said first flat rectangular sheet-form material;
   c. a second flat rectangular sheet-form material of post card sized dimensions, adapted to accept print or correspondence on its reverse face, attached by a second adhesive means to the reverse side of said magnetic material.

2. A novelty post card according to claim 1, further comprising:
   a. a transparent ultra-violet resistant laminate fixed to the obverse face of said first flat rectangular sheet-form material.

3. A novelty post card according to claim 1, wherein said magnetic material is a flat sheet of elastomeric material equal to or less than 10 mils in thickness having dispersed therein a large plurality of small magnetic iron particles.

4. A novelty post card according to claim 2, wherein said magnetic material is a flat sheet of elastomeric material equal to or less than 10 mils in thickness having dispersed therein a large plurality of small magnetic iron particles.

* * * * *